US005276528A

United States Patent [19]
Ishikawa et al.

[11] Patent Number: 5,276,528
[45] Date of Patent: Jan. 4, 1994

[54] COLOR VIDEO SIGNAL RECORDER

[75] Inventors: Hisashi Ishikawa; Yoshitake Nagashima; Katsuji Yoshimura, all of Kanagawa; Susumu Kozuki, Tokyo; Koji Takahashi, Kanagawa; Kenichi Nagasawa, Kanagawa, all of Japan

[73] Assignee: Canon Kabushiki Kaisha, Tokyo, Japan

[21] Appl. No.: 993,829

[22] Filed: Dec. 13, 1992

Related U.S. Application Data

[63] Continuation of Ser. No. 626,234, Dec. 11, 1990, abandoned, which is a continuation of Ser. No. 133,540, Dec. 16, 1987, abandoned.

[30] Foreign Application Priority Data

Dec. 24, 1986 [JP] Japan .................. 61-309438

[51] Int. Cl.$^5$ ........................... H04N 9/80
[52] U.S. Cl. .................... 358/323; 358/330; 360/19.1; 360/22; 360/26; 360/36.1; 360/77.14
[58] Field of Search ........... 358/310, 314, 320, 321, 358/323, 327, 328, 329, 330, 335-; 360/19.1, 22-; 369/59

[56] References Cited

U.S. PATENT DOCUMENTS

| 3,506,777 | 4/1970 | Carlson | 258/323 |
|---|---|---|---|
| 3,513,266 | 5/1970 | Frost et al. | 360/23 |
| 3,553,080 | 1/1971 | Hammond | 360/22 |
| 3,562,723 | 2/1971 | Behr et al. | 360/26 |
| 3,685,021 | 8/1972 | Mauch et al. | 360/22 |
| 3,746,781 | 7/1973 | Nakayama | 360/26 |
| 3,906,152 | 9/1975 | Hoogendijk | 358/323 X |
| 3,968,513 | 7/1976 | de Haan | 358/323 |
| 4,084,176 | 4/1978 | Trost | 358/323 |
| 4,458,271 | 7/1984 | Horstmann | 360/22 X |
| 4,485,395 | 11/1984 | Warren | 360/22 X |
| 4,513,328 | 4/1985 | Heitman | 360/22 X |
| 4,580,174 | 4/1986 | Tokunaka | 358/330 X |
| 4,603,134 | 12/1986 | Kanamaru | 358/343 |
| 4,607,360 | 8/1986 | Fukui | 358/323 X |
| 4,698,694 | 11/1987 | Tomita et al. | 358/330 X |
| 4,709,275 | 11/1987 | Fukuda | 358/330 X |
| 4,758,903 | 7/1988 | Noguchi et al. | 358/330 X |
| 4,764,820 | 8/1988 | Takeshita | 360/22 |
| 4,792,862 | 12/1988 | Tsusue et al. | 358/330 |
| 4,802,031 | 1/1989 | Nagasawa et al. | 360/77.15 |
| 4,812,921 | 3/1989 | Mitsuhashi et al. | 358/343 |

*Primary Examiner*—W. R. Young
*Attorney, Agent, or Firm*—Robin, Blecker, Daley & Driscoll

[57] ABSTRACT

A color video signal recorder is arranged to record on one and the same recording medium first and second signals which are obtained by frequency dividing at different phases the frequency modulation wave of a frequency modulated color video signal which includes a luminance signal and a carrier chrominance signal.

12 Claims, 6 Drawing Sheets

COLOR VIDEO SIGNAL RECORDER

This is a continuation application under 37 CFR 1.62 of prior application Ser. No. 626,234, filed Dec. 11, 1990, now abandoned, which is a continuation application under 37 CFR 1.62 of prior application Ser. No. 133,540, filed Dec. 16, 1987, and now abandoned.

BACKGROUND OF THE INVENTION

1. Field of the Invention

This invention relates to a color video signal recorder and more particularly to an apparatus for recording a wide-band color video signal.

2. Description of the Related Art

Various standards of TV signals of high definition and wide bands have recently been proposed for improvement in reproduced picture quality of the TV signals. For example, there have been proposed a so-called high definition TV signal which is arranged to have a frequency band of about 20 MHz for a luminance signal (hereinafter referred to as a HD-TV signal) and a so-called extended definition TV signal (hereinafter referred to as an ED TV signal) which has a band of about 8 MHz for a luminance signal and is arranged to be interchangeable with the conventional TV signal.

These wide-band TV signals are not recordable nor reproducible with the conventional video tape recorder which is arranged to have a recordable and reproducible band of only about 4 MHz. To solve this problem, there has been proposed various video tape recorders (hereinafter referred to as VTRs) which are arranged to perform recording or reproduction by converting the wide-band TV signal into a multi-channel signal with the band of each channel arranged to be about 4 MHz.

In performing such multi-channel recording, however, the VTR is required to completely eliminate the adverse effect of jitter or the like. This requirement results in a complex reproducing circuit arrangement even if a composite video signal which includes a luminance signal and a carrier chrominance signal is processed into a multi-track signal by a simple band dividing method or the like. Especially, in cases where the video signal is to be divided into a high frequency component and a low frequency component, the time constants of the circuits processing these two components differ from each other. Therefore, it is very difficult to restore the video signal with high fidelity to its original state during a reproducing operation by temporally matching these two components with each other.

Further, in the case of recording a composite video signal by dividing it into R, G and B component signals etc., since each of them is wide-band signal, they must be recorded in a multi-channelled manner. Therefore, the number of channels increases too much for high density recording. Further, a VTR is preferably arranged to be capable of recording an audio signal or a stereo audio signal, if possible, at a high relative speed. However, it has been difficult to accomplish such audio signal recording in accordance with the above stated method.

To solve this problem, there have recently been proposed various methods of recording video and audio signals by digitizing them. However, such a method hardly permits high density recording, because the digitizing arrangement further increases the band of each component signal.

SUMMARY OF THE INVENTION

This invention is directed to the solution of the above stated problems of the prior art.

It is therefore an object of this invention to provide a color video signal recorder which is capable of recording a wide-band color video signal with a high degree of density.

It is another object of the invention to provide a color video signal recorder which is arranged to record a color video signal of a wide frequency band as signals of a plurality of channels carrying information at equal frequencies and in the same signal form.

To attain this object, a color video signal recording apparatus arranged as an embodiment of this invention comprises input means for receiving a composite video signal including a luminance signal and a carrier chrominance signal; modulation means for angle modulating the composite video signal supplied from the input means; channel dividing means for forming first and second signals by frequency dividing at different phase the angle modulated luminance signal modulated by the modulation means; and recording means for recording the first and second signals on a common recording medium.

These and further objects and features of this invention will become apparent from the following detailed description of embodiments thereof taken in connection with the accompanying drawings.

DETAILED DESCRIPTION OF THE PREFERRED EMBODIMENTS

Figure 1:
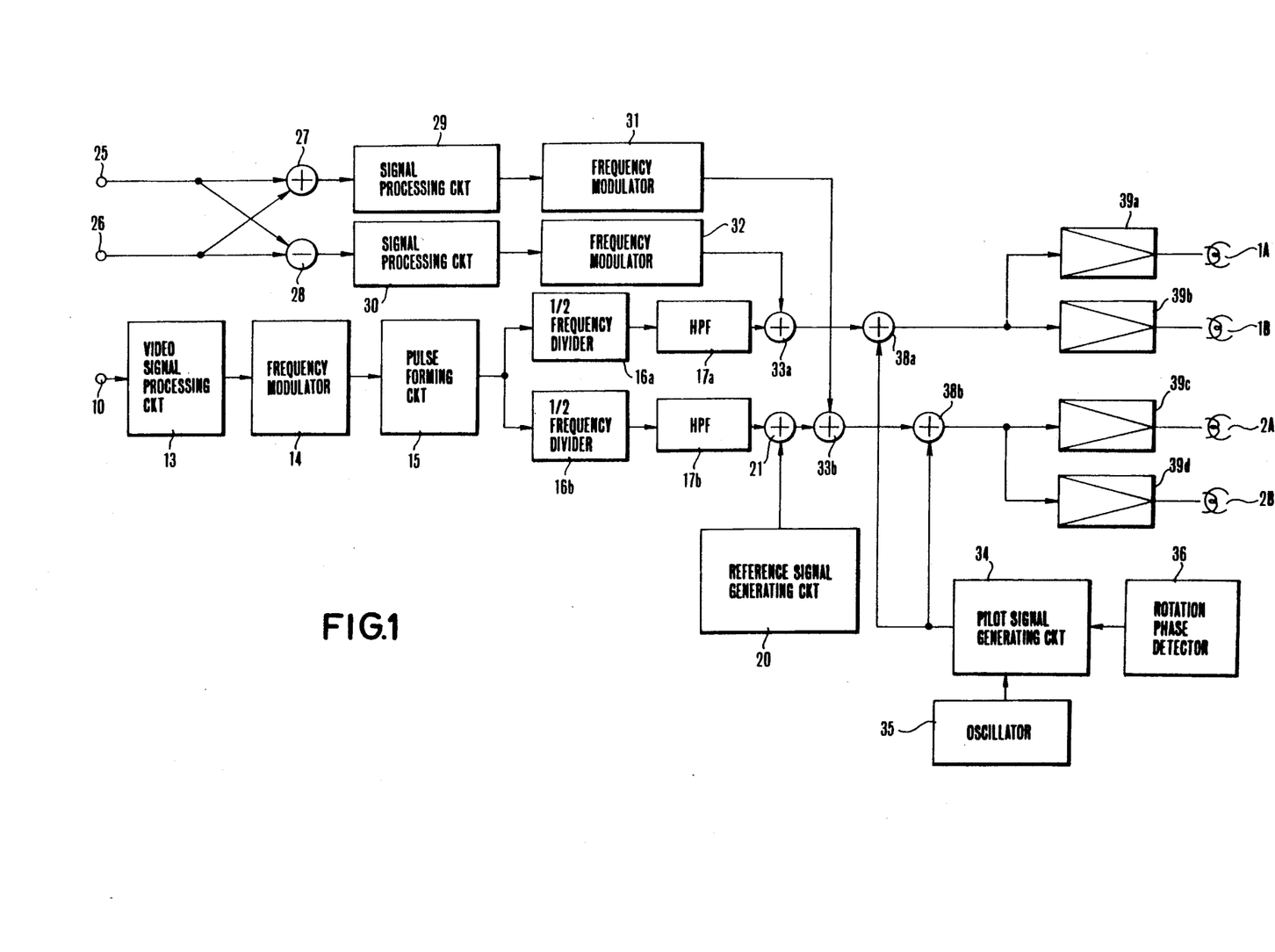
FIG. 1 is a block diagram showing the arrangement of the recording system of a VTR which embodies this invention.
Figure 2A:
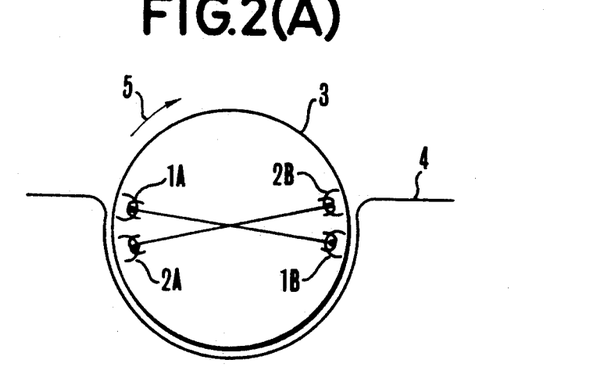
FIGS. 2(A) and 2(B) are illustrations of the head arrangement of the VTR of FIG. 1.
Figure 2B:
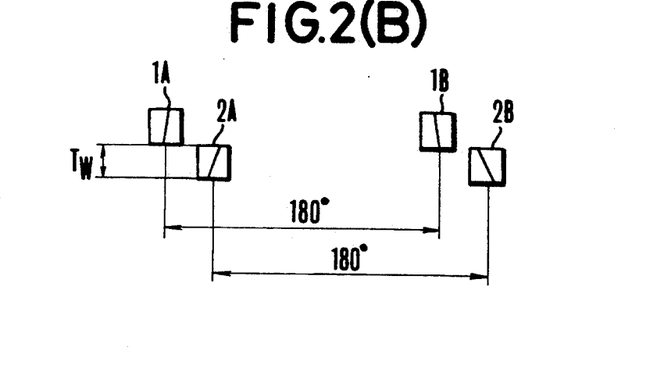
Figure 5A:
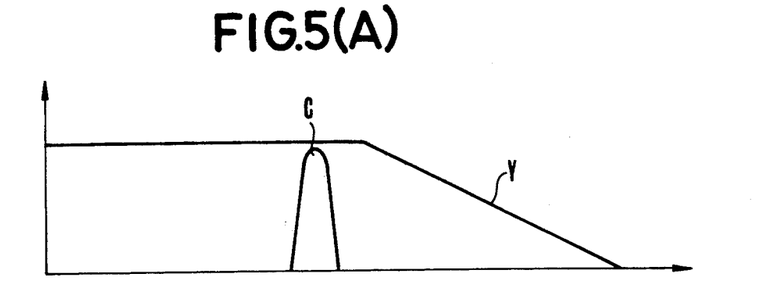
FIGS. 5(A) to 5(D) show the spectrum distribution of signals produced from various parts of FIG. 1.

The details of an embodiment of this invention are as follows: The embodiment which is a VTR is assumed to be receiving a video signal of the NTSC color system having a spectrum distribution as shown in FIG. 5(A) with the luminance signal band thereof about 8 MHz. In FIGS. 5(A) to 5(D), a reference symbol Y denotes the frequency spectrum of a luminance signal and a symbol C that of a carrier chrominance signal. FIG. 1 shows in a block diagram the recording system of the VTR embodying this invention. FIGS. 2(A) and 2(B) show the head arrangement of the same VTR. In the case of this VTR, a composite NTSC color TV signal is frequency modulated to have a modulated frequency value which is about twice as high as the conventional value and includes, for example, 8.4 MHz for the synchronous tip of the luminance signal and 10.8 for the white peak part thereof. Then, the VTR forms a signal which is inverted in synchronism with the rise of the frequency modulated wave and a signal which is inverted in synchronism with the fall of the wave. The signals thus obtained are arranged to be video signals of two different channels. One of the two video signal channels is arranged to have the sum signal of the L and R channels of a stereo audio signal superimposed on the video signal. Meanwhile, on the video signal of the other channel are superimposed a difference signal and a reference signal which is to be used by a reproducing system for time base correction. The recording signals which are thus prepared in two channels are arranged to be simultaneously recorded.

Referring to FIGS. 2(A) and 2(B), heads 1A and 1B are arranged to record the recording signal of a first channel and heads 2A and 2B to record the recording signal of a second channel. The heads 1A and 1B make 30 revolutions per sec at a phase difference of 180 degrees from each other. Other heads 2A and 2B revolve at phases close to the heads 1A and 1B also with the same phase different of 180 degrees. The azimuth angle of these heads 1A, 1B, 2A and 2B are arranged to be $+10°$, $-10°$, $+30°$ and $-30°$ respectively. As shown in FIG. 2(A), these four heads are secured to a rotary cylinder 3. A magnetic tape 4 is wrapped at least 180 degrees around the rotary cylinder 3. The cylinder 3 is arranged to rotate in the direction of arrow 5. The heads 2A and 2B are set back away from the heads 1A and 1B at a stepwise distance TW respectively as shown in FIG. 2(B). This stepwise difference approximately coincides with a track pitch at which recording tracks are to be formed on the tape.

Figure 3:
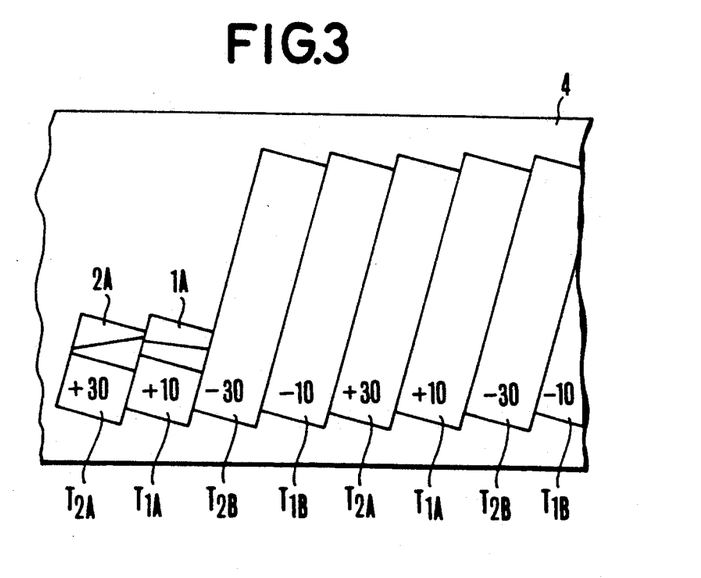
FIG. 3 shows a recording pattern which is obtained on a magnetic tape as a result of recording by the VTR of FIG. 1.

FIG. 3 shows a recording pattern resulting from recording performed on the magnetic tape 4 by the heads 1A, 1B, 2A and 2B shown in FIGS. 2(A) and 2(B). Two recording tracks are simultaneously formed. Tracks T1A and T1B in which the signals of the first channel are recorded are formed alternately with the tracks T2A and T2B in which the signals of the second channel are recorded in the manner as shown in FIG. 3. The azimuth angles are arranged as shown to have a difference of at least 20 degrees between adjacent tracks. During reproduction, the arrangement prevents a cross-talk from an adjoining track. The tape 4 is arranged to be caused by means of a capstan, etc. to travel a distance corresponding to 2 TW while each of the head turns around 180 degrees.

Figure 4:
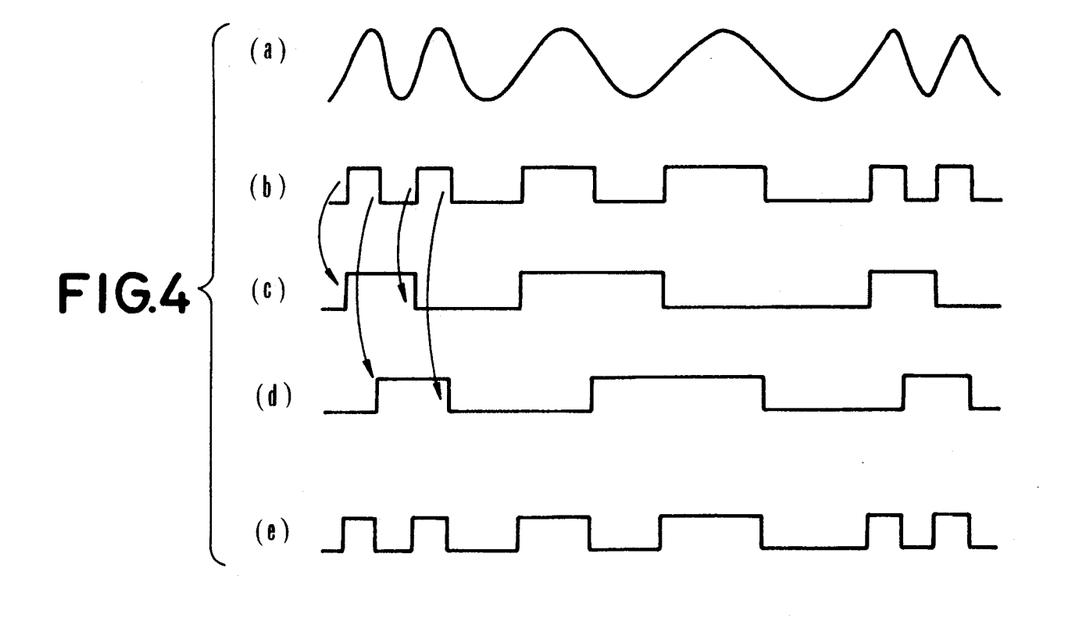
FIG. 4 shows a manner in which a luminance signal is divided into channels.
Figure 5B:
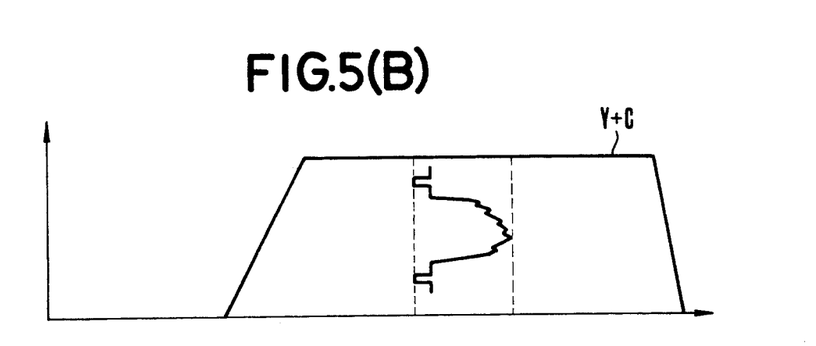

The details of the recording signals to be supplied to the heads are as follows: Referring to FIG. 1, an input terminal 10 is arranged to receive a composite NTSC signal. The input signal is then supplied to a video signal processing circuit 13 which includes an AGC circuit, a clamp circuit, a clip circuit, a preemphasis circuit and other known circuits. The video signal processed by the circuit 13 is supplied to a frequency modulator 14. The modulator 14 modulates the video signal with a modulation frequency which is two times as high as the luminance signal modulation frequency of the conventional VTR (including, for example, 8.4 MHz for the sync. tip part and 10.8 MHz for the white peak part). The signal which is thus modulated has a spectrum distribution as shown in FIG. 5(B). The wave form of the frequency modulated video signal is processed by a pulse forming circuit 15 into a pulse-like shape which is inverted at a zero crossing point. The output of the circuit 15 is supplied to ½ frequency dividers 16a and 16b. The frequency divider 16a is arranged to perform a ½ frequency dividing process by inverting the level of the signal between a high level and a low level at the rise of the pulses produced from the pulse forming circuit 15. The other frequency divider 16b is arranged to perform a ½ frequency dividing process by inverting the signal between high and low levels at the fall of the pulses. In other words, the ½ frequency divider 16a is arranged to retain the timing of the rising edges of the pulses related to the frequency modulation and the ½ frequency divider 16b to retain the timing of the falling edges of the pulses. These operations are as shown in wave forms at parts (a), (b), (c) and (d) in FIG. 4. In FIG. 4, the part (a) shows the output of the frequency modulator 14; the part (b) the output of the pulse forming circuit 15; the part (c) the output of the ½ frequency divider 16a; and the part (d) the output of the ½ frequency divider 16b respectively.

The signals, i.e. the video signals of the first and second channels, which are frequency divided in the manner as described above are respectively supplied to high-pass filters (HPFs) 17a and 17b. The HPFs 17a and 17b then attenuate the band components for a frequency modulated audio signal which will be described later and supply their outputs to adders 33a and 21. A reference signal generating circuit 20 is arranged to generate a time-base correction reference signal which has a frequency between 700 and 800 KHz or thereabout. The reference signal is supplied to the adder 21 to be added together with the video signal of the second channel. After that, the output of the adder 21 is supplied to another adder 33b arranged subsequent to the adder 21.

An L-channel audio signal which is supplied to an input terminal 25 and an R-channel audio signal which is supplied to another input terminal 26 are supplied both to an adder 27 and a subtracter 28. As a result, the adder 27 produces a sum signal (L+R) representing the sum of the two channels and the subtracter 28 a difference signal (L−R) between the two channels. These signals are subjected to an emphasizing process and a logarithmic compression process which are carried out at signal processing circuits 29 and 30. The signals thus processed are supplied to frequency modulators 31 and 32. Then, the modulators 31 and 32 produce frequency modulated audio signals. The modulated audio signals are added to the signals of the first and second channels at the adders 33a and 33b.

A pilot signal generating circuit 34 is arranged to generate pilot signals to be used for tracking control in accordance with the known four frequency method. The circuit 34 serially produces pilot signals of four different kinds by frequency dividing the oscillation signal of an oscillator 35 at each of four different frequency dividing rates. These frequency dividing rates are changed from one over to another in rotation at a timing determined on the basis of a rectangular waveform signal of 30 Hz which represents the rotation phase of the head. This signal (hereinafter referred to as the PG signal) is produced from a rotation phase detector 36. The pilot signals thus obtained are supplied to adders 38a and 38b to be added to the signals of the first and second channels.

Figure 5C:
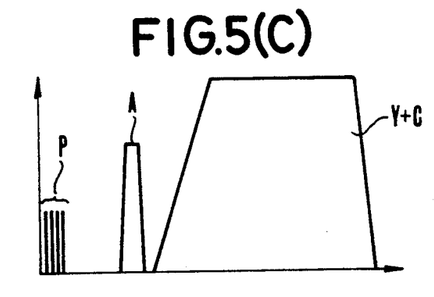
Figure 5D:
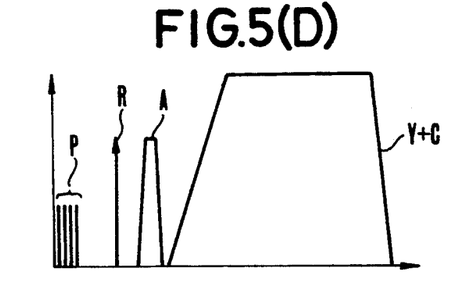

FIGS. 5(C) and 5(D) show the frequency allocation of the recording signals of the first and second channels which are obtained from the adders 38a and 38b in the manner as described in the foregoing. As shown, the band-width of the frequency allocation is exactly the same as that of the conventional VTR for both of the two channels. Therefore, these signals are of course recordable. Further, in FIGS. 5(C) and 5(D), a reference symbol Y+C denotes the video signal; a symbol A the audio signal; and a symbol P the pilot signals.

These recording signals of the first and second channels are supplied via recording amplifiers 39a, 39b, 39c and 39d to the heads 1A, 1B, 2A and 2B. The signal of the first channel is recorded by the heads 1A and 1B and the signal of the second channel by the heads 2A and 2B on the magnetic tape 4 in the manner as shown in FIG. 3. One of the pilot signals of four different kinds or frequencies is recorded in every two tracks.

Figure 6:
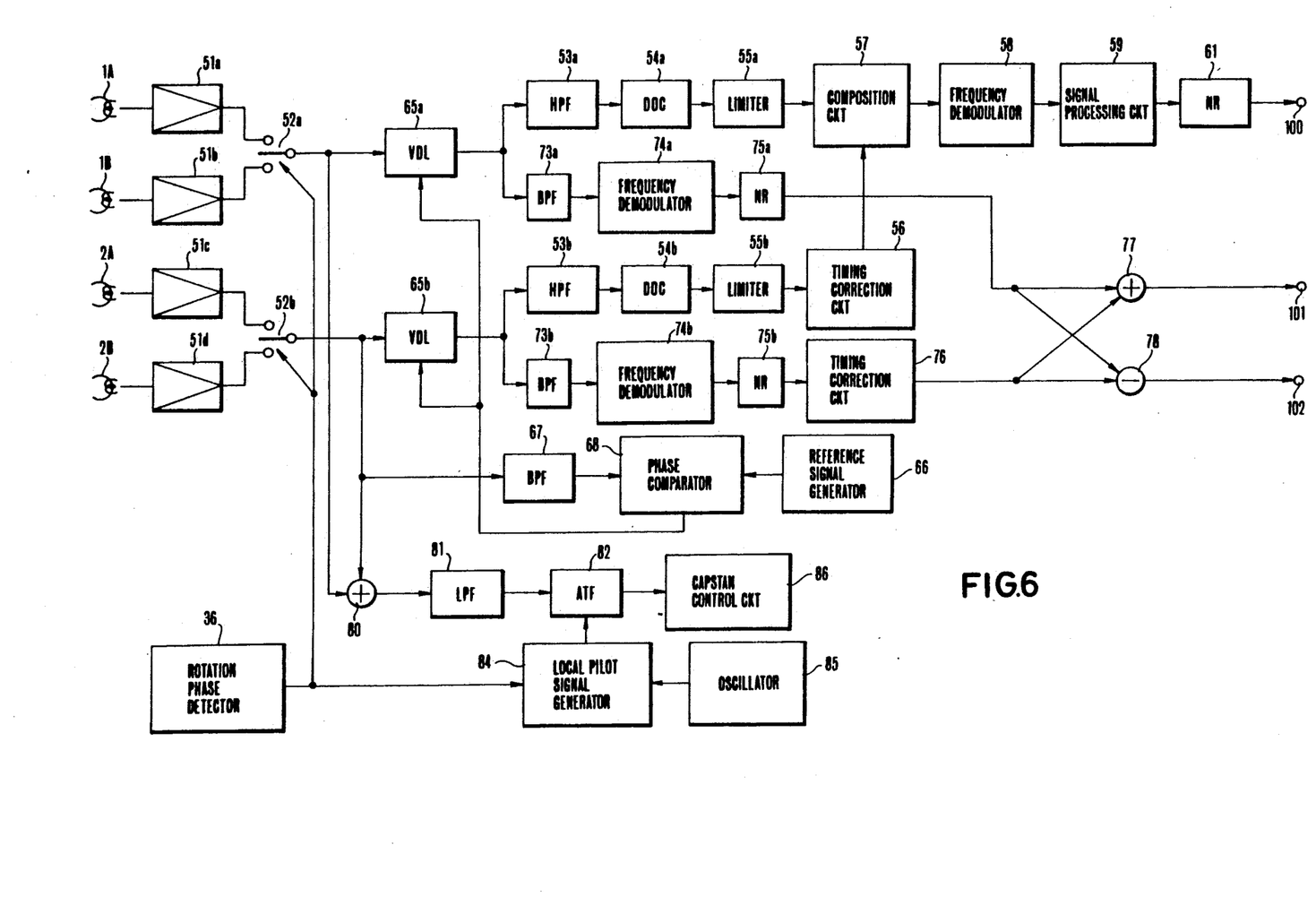
FIG. 6 is a block diagram showing the arrangement of the reproducing system corresponding to the recording system of the same VTR shown in FIG. 1.

FIG. 6 shows in a block diagram the arrangement of the reproducing system of the VTR of this embodiment. In reproducing recorded signals, the heads 1A, 1B, 2A and 2B trace the recording tracks T1A, T1B, T2A and T2B respectively. The signal of the first channel which is reproduced by the heads 1A and 1B is amplified by head amplifiers 51a and 51b. A switch 52a which operates under the control of the PG signal from the above stated rotation phase detector 36 is arranged to produce the signal being reproduced by the tracing actions of the heads in the form of a serial signal. The output of the switch 52a is supplied via a variable delay line 56 (hereinafter referred to as VDL) 65a to an HPF 53a. The HPF 53a then separates only the video signal of the first channel from the reproduced signal. A drop-out compensation circuit (hereinafter referred to as DOC) 54a is arranged to substitute a signal part obtained one horizontal scanning period before for any signal part at which a drop-out is found in the reproduced signal. The video signal of the first channel which is thus processed through the circuit 54a is supplied to a limiter 55a to be shaped into a pulse-like form with level variations eliminated by the limiter 55a.

Meanwhile, the video signal of the second channel is reproduced by the heads 2A and 2B and is also amplified by head amplifiers 51c and 51d. The amplified video signal of the second channel is then processed by a switch 52b into a serial signal. The signal from the switch 52b is processed likewise by a VDL 65b, an HPF 53b, a DOC 54b and a limiter 55b to be made into a pulse-shaped video signal of the second channel. A timing correction circuit 56 is arranged to correct the output timing of the second video signal for the purpose of compensating for any deviation of the relative position of the head occurred during reproduction from the head position obtained during recording. The pulse-shaped video signals of the first and second channels which are thus obtained are supplied to a composition circuit 57 to be made into a pulse-shaped frequency modulated video signal relative to the original video signal of a wide frequency band. This composition circuit 57 is composed of, for example, an exclusive OR circuit (EXOR). The wave form of the output of the circuit 57 is as shown at a part (e) in FIG. 4.

The frequency modulated video signal which is composed by the circuit 57 is frequency demodulated by a frequency demodulator 58. The demodulated video signal is processed into the original video signal, i.e. the composite NTSC signal, by a signal processing circuit 59 which includes a deemphasis circuit. The signal thus produced from the circuit 59 is supplied to a noise reduction (NR) circuit 61 to have a noise component suppressed there before the signal is produced from an output terminal 100.

The frequency modulated audio signal (a sum signal) separated by the BPF 73a from the output of the VDL 65a is demodulated by a frequency demodulator 74a. The demodulated audio signal is supplied to a noise reduction (NR) circuit 75a to have noises resulting from the above stated emphasizing and logarithmic compressing processes removed therefrom. The NR circuit 75a thus produces a reproduced sum signal (L+R). Meanwhile, the frequency modulated audio signal (a difference signal) which is separated by the BPF 73b from the output of the VDL 65b is likewise demodulated by a frequency demodulator 74b. The demodulated audio signal from the demodulator 74b is supplied to another NR circuit 75b to obtain a reproduced difference signal (L−R). The reproduced difference signal (L−R) is supplied to a timing correction circuit 76 to make the timing thereof coincide with that of the reproduced sum signal (L+R). Then each of these signals is supplied to an adder 77 and a subtracter 78 to obtain the reproduced audio signals of the L and R channels respectively.

Through the above stated processes, the reproduced wide-band NTSC signal is produced from an output terminal 100; and the reproduced audio signals of the L and R channels from output terminals 101 and 102.

The signal produced from the switch 52a is added by an adder 80 to the signal produced from the switch 52b. The output of the adder 80 is supplied to an LPF 81, which separates the pilot signal component from the output of the adder 80. The separated pilot signal component is supplied to a tracking control signal generating circuit (hereinafter referred to as ATF circuit) 82. Meanwhile, local pilot signals of four different frequencies which are arranged to be produced in rotation in the same order as the pilot signals recorded are also supplied to the ATF circuit 82. The illustration further includes a local pilot signal generator 84 and an oscillator 85. The ATF circuit 82 obtains a tracking error signal through a process carried out in accordance with the known four-frequency method by handling as one unit two adjacent tracks which are being simultaneously traced. Then, in accordance with the tracking error signal, a capstan control circuit 86 causes a capstan which is not shown to control the travel of the magnetic tape 4 in such a way as to have each head accurately trace each applicable track on the tape.

The time base correcting VDLs 65a and 65b are controlled in the following manner: A reference signal which is separated by a BPF 67 from the recording signal of the second channel is supplied to a phase comparator 68. The comparator 68 then compares the phase of the reference signal with that of another reference signal which is generated by a generator 66 and is of the same frequency as the former. The operation of the VDLs 65a and 65b is controlled on the basis of the output of this phase comparator 68 to remove any jitter.

The VTR which is arranged as described in the foregoing as an embodiment of this invention is capable of recording a wide-band NTSC signal together with a stereo audio signal with a simple arrangement.

Figure 7:
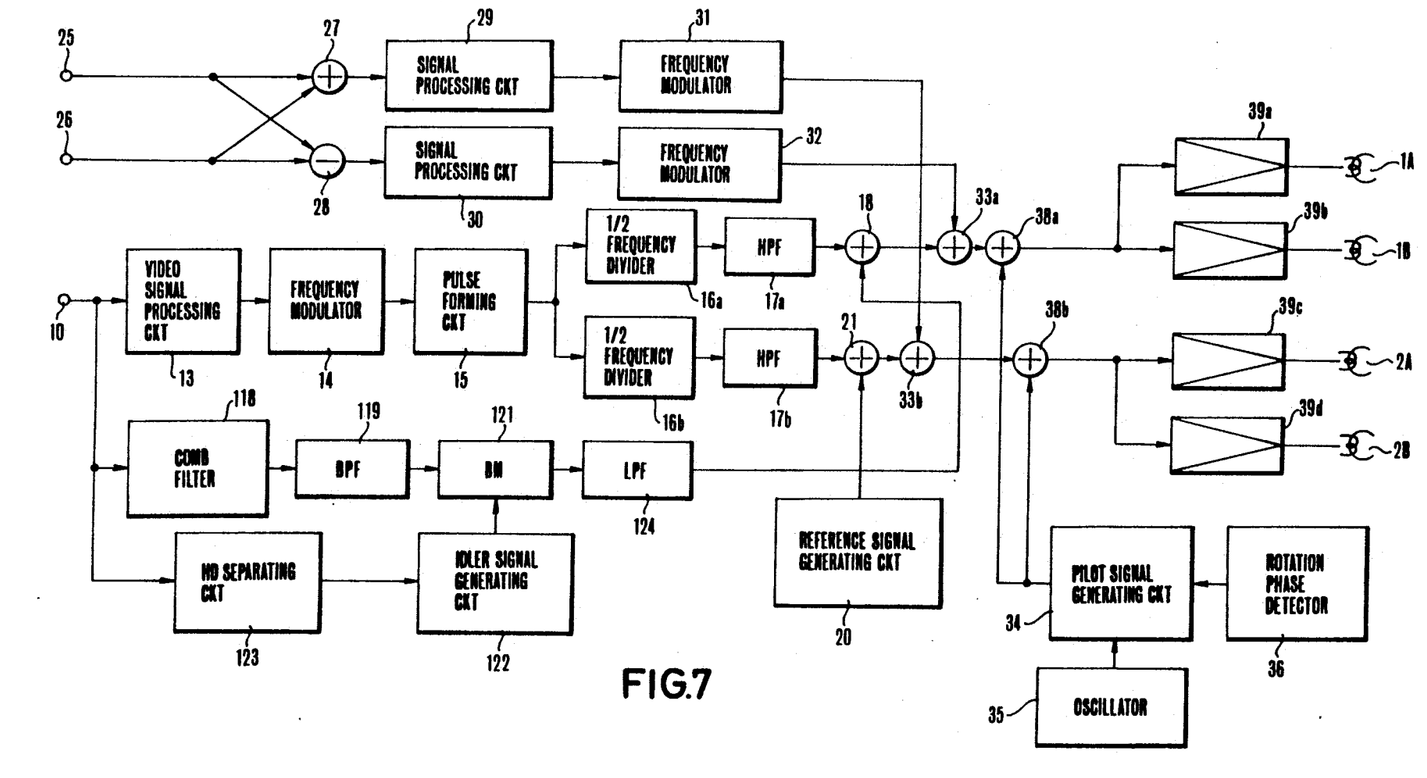
FIG. 7 is a block diagram showing the recording system of a VTR which is arranged as another embodiment of this invention.

FIG. 7 shows the arrangement of the recording system of a VTR which is also arranged in accordance with this invention as another embodiment thereof. In FIG. 7, components similar to those of FIG. 1 are indicated by the same reference numerals and the details of them are omitted from the following description: In this case, the invention is applied to a VTR, wherein a known carrier chrominance signal which is low-band converted in the same manner as in the conventional VTR is to be further multiplexed with the low-band portion of the recording signal of the first channel.

A chrominance signal included in an NTSC signal which is supplied to an input terminal 10 is separated from the NTSC signal by a comb filter 118. The signal thus separated is supplied to a BPF 119 to have its band limited there. The signal from the BPF 119 is supplied to a balanced modulator 121 (hereinafter referred to as BM) which is arranged to perform frequency modulation. The BM 121 converts the carrier frequency of the chrominance signal, for example, to 743 KHz or thereabout on the basis of an idler signal which is supplied from an idler signal generating circuit 122. This idler signal has a frequency which is determined by a horizontal synchronizing signal separated in a known manner at a horizontal synchronizing signal (HD) separating circuit 123. Further, for the purpose of removing the cross-talk component of the chrominance signal coming from an adjoining track during reproduction, the frequency of this idler signal is arranged to vary by ½ horizontal frequency fH for every period of 1/60 sec. As a result of this arrangement, the carrier frequency of the recording chrominance signal shifts as much as ¼ fH for every two tracks.

In the signal produced from the BM 121, the lower side-band component is alone allowed to pass through an LPF 124 as a low-band converted chrominance signal. The low-band converted chrominance signal which is thus obtained from the LPF 124 is supplied to an adder 18.

With respect to the recording signal of the first channel, the VTR records this signal in the same manner as the conventional VTR, so that the signal of the first channel thus recorded is reproducible with the conventional two-head type VTR. In other words, with regard to the video signal, the video signal of the first channel is arranged to be reproduced as a frequency modulated luminance signal. Meanwhile, an audio signal which is the sum of the two channels of a stereo signal is arranged to be reproduced as a monoral audio signal.

The reproducing system of the VTR of this embodiment can be arranged in the same manner as in the case of FIG. 6 and is, therefore, omitted from description.

Further, while the embodiment is arranged to frequency multiplex the frequency modulated audio signal with the video signal, this arrangement can be changed to record the frequency modulated audio signal on a deep or inner layer of the magnetic recording medium while the video signal is recorded on the surface layer of the medium.

The embodiment described is arranged to do the tracking control by the so-called four-frequency method. However, this arrangement may be changed, for example, to record some control signal relative to the pitch of the tracks along one edge part of the magnetic recording tape and to carry out tracking control by reproducing the control signal.

What is claimed is:

1. A color video signal recording apparatus comprising:
    a) input means for inputting a composite video signal which includes a luminance signal and a carrier chrominance signal;
    b) modulation means for angle modulating said composite video signal input from said input means;
    c) channel dividing means for forming first and second signals by frequency dividing at different phases the angle modulated composite video signal provided by said modulation means;
    d) filtering means for only passing a component of said first signal which is higher than a predetermined frequency;
    e) reference signal generating means for generating a reference signal a frequency of which is lower than said predetermined frequency;
    f) pilot signal generating means for generating a pilot signal for tracking control a frequency of which is lower than that of said reference signal;
    g) multiplexing means for multiplexing said reference signal and said pilot signal with said first signal as output by said filtering means; and
    h) recording means for recording said first signal processed through said multiplexing means and said second signal on a common recording medium.

2. An apparatus according to claim 1, wherein said recording means includes first and second rotary heads which are arranged to have azimuth angles different from each other and to record said first and second signals by forming adjacent tracks on said recording medium.

3. An apparatus according to claim 2, wherein said recording means further includes third and fourth rotary heads which are arranged to record said first and second signals by tracing a surface of said recording medium at a period different from a tracing period of said first and second rotary heads and by forming adjacent traces on said medium.

4. An apparatus according to claim 3, wherein the azimuth angles of said first, second, third and fourth heads are different from each other.

5. An apparatus according to claim 4, further comprising reproducing means for reproducing said first and second signals from said recording means and separating means for separating said reference signal from said first signal reproduced by said reproducing means.

6. An apparatus according to claim 5, further comprising time-base correction means for correcting, on the basis of said reference signal separated by said separating means, the time base of both said first and second signals.

7. A color video signal recording apparatus comprising:
    a) input means for inputting a luminance signal and a carrier chrominance signal;
    b) modulation means for angle modulating said luminance signal input to said input means;
    c) channel dividing means for forming first and second signals by frequency dividing at different phases the angle modulated luminance signal provided by said modulation means;
    d) first filtering means for only passing a component of said first signal which is higher than a predetermined frequency;
    e) second filtering means for only passing a component of said second signal which is higher than said predetermined frequency;
    f) frequency conversion means for converting a frequency band of said carrier chrominance signal to produce a converted chrominance signal;
    g) reference signal generating means for generating a reference signal a frequency of which is lower than said predetermined frequency;

h) pilot signal generating means for generating a pilot signal for tracking control a frequency of which is lower than that of said reference signal;

i) first multiplexing means for multiplexing said reference signal and said pilot signal with said first signal as output by said first filtering means;

j) second multiplexing means for multiplexing said converted chrominance signal and said pilot signal with said second signal as output by said second filtering means; and k) recording means for recording said first signal processed through said first multiplexing means and said second signal processed through said second multiplexing means on a common recording medium.

8. An apparatus according to claim 7, wherein said recording means includes first and second rotary heads which are arranged to have azimuth angles different from each other and to record said first and second signals by forming adjacent tracks on said recording medium.

9. An apparatus according to claim 8, wherein said recording means further includes third and fourth rotary heads which are arranged to record said first and second signals by tracing a surface of said recording medium at a period different from a tracing period of said first and second rotary heads and by forming adjacent tracks on said medium.

10. An apparatus according to claim 9, wherein the azimuth angles of said first, second and fourth heads are different from each other.

11. An apparatus according to claim 10, further comprising reproducing means for reproducing said first and second signals from said recording means and separating means for separating said reference signal from said first signal reproduced by said reproducing means.

12. An apparatus according to claim 11, further comprising time-base correction means for correcting, on the basis of said reference signal separated by said separating means, the time base of both said first and second signals.

* * * * *

UNITED STATES PATENT AND TRADEMARK OFFICE
CERTIFICATE OF CORRECTION

PATENT NO. : 5,276,528
DATED : January 4, 1994
INVENTOR(S) : Hisashi Ishikawa, et al It is certified that error appears in the above-indentified patent and that said Letters Patent is hereby corrected as shown below:

Col. 3, line 20. Change "angle" to -- angles --

Col. 3, line 48. Change "etc." to -- etc., --

Col. 5, line 47. After "head" insert -- which --

Col. 8, line 3. Change "or" to -- of --

Signed and Sealed this

Twenty-fourth Day of May, 1994

Attest:

BRUCE LEHMAN

*Attesting Officer*     *Commissioner of Patents and Trademarks*